United States Patent [19] Fletcher et al.

[11] 3,778,786

[45] Dec. 11, 1973

[54] DATA STORAGE, IMAGE TUBE TYPE

[76] Inventors: James C. Fletcher, Administrator of the National Aeronautics and Space Administration with respect to an invention of; Phillip C. Lipoma, Dickinson, Tex.

[22] Filed: June 28, 1972

[21] Appl. No.: 266,899

[52] U.S. Cl. .... 340/173 CR, 340/173 LM, 328/123
[51] Int. Cl. .... G11c 11/30
[58] Field of Search .... 340/173 LM, 173 CR

[56] References Cited

UNITED STATES PATENTS

| | | | |
|---|---|---|---|
| 3,229,261 | 1/1966 | Fatuzzo | 340/173 LS |
| 3,657,708 | 4/1972 | Kroy | 340/173 LS |
| 2,901,662 | 8/1959 | Nozick | 340/173 CR |

*Primary Examiner*—Terrell W. Fears
*Attorney*—Marvin J. Marnock et al.

[57] ABSTRACT

Method and apparatus for the storage of digital or analog electrical signals are provided by a memory storage system employing a conventional vidicon tube. At the beginning of an operating cycle, the vidicon is conditioned to accept electrical data input by exposing its photosensitive target to a short, high intensity light flash. A first electron beam scan of the photosensitive surface by an electron beam modulated by the input data then sets up a charge pattern on the photosensitive target which is representative of the input data. A second electron beam scan of the photosensitive surface by an unmodulated electron beam then develops an output signal across an output resistor by means of capacitive currents. The conditioning and scanning steps are operated repetitively at high speed using conventional television camera scan, sync and power supply circuitry to provide a low cost data storage system.

5 Claims, 3 Drawing Figures

PATENTED DEC 11 1973 3,778,786

DATA STORAGE, IMAGE TUBE TYPE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

1. Field of the Invention

The present invention relates to the storage of data in the form of electrical signals, and more particularly to the storage of analog and/or digital data by the use of a low cost television vidicon tube configured as a serial readout memory. As an exemplary application, the present invention is intended for use in a television color converter designed for the NASA Space Shuttle program.

2. Brief Description of the Prior Art

Modern techology for data processing has produced very efficient memory devices such as magnetic drum memories, magnetic core memories and thin film transistor logic memories for the storage of data. Some such devices are capable of storing analog data while others are better suitable for the storage of digital data. A relatively few devices such as disc file memories or the like may be used interchangably for the storage of anaolog or digital data. Usually, however, such devices are relatively expensive, perhaps bulky, and critical in regard to their operating conditions. Magnetic recorders employed for storage also exhibit varying amounts of undesirable time base instability.

Electrostatic storage tubes were used in the early days of digital computers as memory devices for digital data. These tubes were very sensitive to operating voltages and environmental conditions, they were expensive and often proved unreliable. The time required to prepare these early tubes for storage was also undesirably long. As computer technology progressed, the use of these tubes was generally discontinued for these reasons. In the meantime, vidicon tubes which were initially developed for use in television transmission have become relatively inexpensive to obtain and are readily available in rather high quality configurations. Typically, vidicon tubes having less than 10 percent shading characteristics are presently available in the low price range. Tube-to-tube differential shading of less then five percent also exhibited in modern vidicon tubes. The present invention contemplates the use of such high quality, low cost vidicon tubes configured as electrical signal-in, electrical signal-out storage devices for analog or digital data.

SUMMARY OF THE INVENTION

The present invention provides a data storage system in which a conventional high quality, low cost television vidicon tube is employed as the data storage medium for an electrical input, electrical output signal system. Conventional vidicon scan circuitry, blanking circuitry and power supply circuitry are used in the system. The vidicon storage medium is conditioned for data storage at the beginning of each operating cycle of the system by exposing the photosensitive surface to an intense light flash from a strobe lamp which forms a uniform charge distribution over the surface. The vidicon's photosensitive surface is then scanned with an eletron beam which is modulated in current intensity by electrical input signals representative of the analog and/or digital data to be stored. The charge pattern on the photosensitive surface is thus altered or redistributed to correspond to the input data. A second unmodulated electron beam scan of the photosensitive surface then provides an electrical output signal which is modulated in accordance with the altered charge pattern on the vidicon's photosensitive surface. Thus, the input data is reproduceable in an electrical output signal at will, providing storage of the input data.

Accordingly, it is an object of the invention to provide a relatively low cost memory storage system which may be used for analog or digital data storage.

It is a further object of the invention to provide an electrical input and electrical output signal storage system employing low cost, high quality vidicon television tubes as the data storage media.

It is a still further object of the invention to provide a vidicon data storage system employing electrical input and electrical output signals but which uses optical conditioning of the storage media for rapidity of operation.

The foregoing and other objects, advantages and features of the present invention will be more readily apparent from the following specification, claims and the related drawings.

DESCRIPTION OF THE ILLUSTRATED EMBODIMENTS

Figure 1:
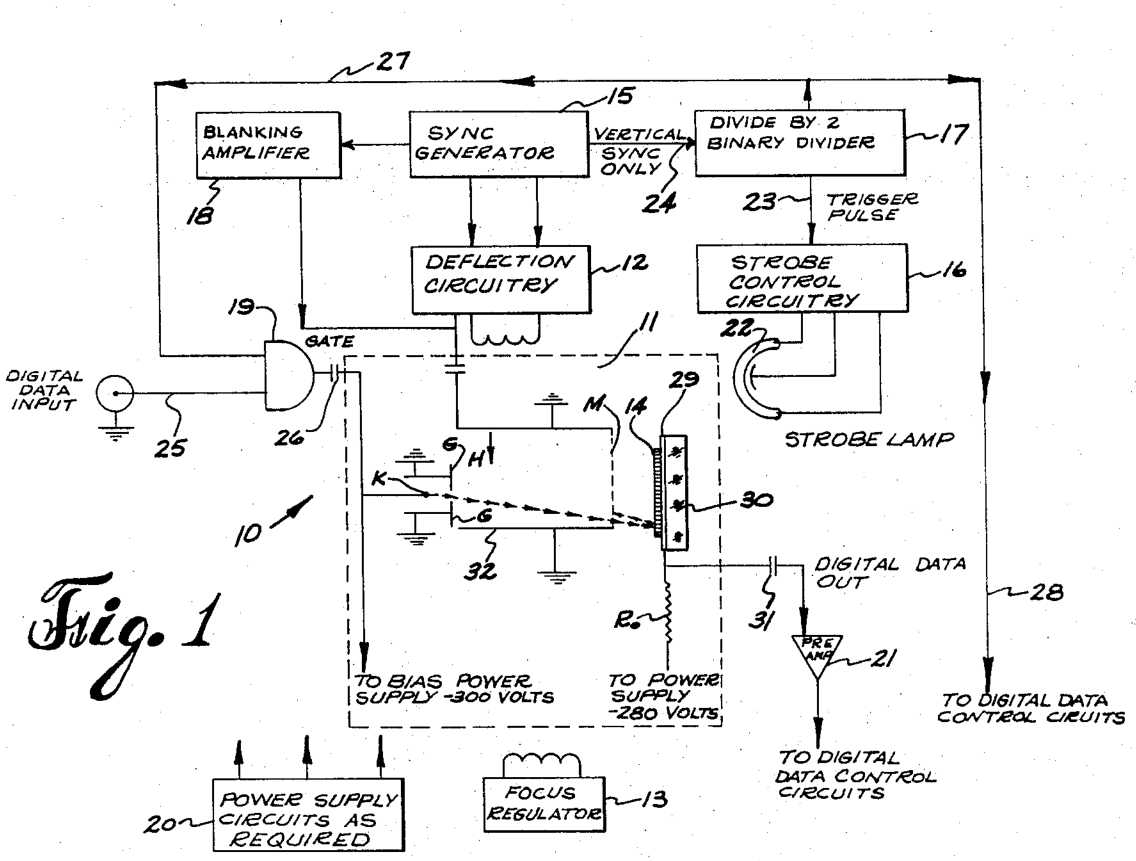
FIG. 1 is a schematic circuit diagram of one embodiment of the invention for use as a digital data storage system.

Referring initially to FIG. 1, a schematic diagram illustrating the principles of the present invention is illustrated generally at 10. A conventional, high quality, low cost vidicon tube indicated generally at 11 (shown within a dotted box) is shown configured as a memory storage device for electrical input signals representative of digital data. Control circuitry of a conventional nature such as that commonly employed in modern television camera systems is provided for operation of the vidicon memory system. Conventional deflection circuitry 12 and focus circuitry 13 are provided for sweeping and focusing an electron beam from a cathode K of vidicon 11 across a photosensitive target surface 14 of the vidicon. The deflection circuitry 12 and strobe control circuits 16 are provided with control signal voltage pulses and sweep synchronization pulses by conventional sync generator circuitry 15. As known in the art, the sync generator circuitry normally provides horizontal sync pulses to control the horizontal deflection of the electron beam scan across the photosensitive target 14 on each of 262 ½ horizontal scans and also supplies vertical sync voltage pulses at the end of each sequence of 262 ½ horizontal scans as in a conventional video system. The vertical sync pulse is also amplified by a conventional blanking amplifier 18 and used to shut off the electron scan beam during retrace. In the present invention, the vertical sync pulses are also supplied via line 24 to a binary divide-by-two divider 17 which thus produces an output trigger pulse on line 23 for each two vertical sync pulses input to it on line 24.

The trigger pulses supplied on line 23 are input to strobe control circuitry 16 which, upon receipt of the trigger pulse, generates a high voltage pulse across a strobe lamp 22 causing the lamp 22 to produce an intense light output pulse or flash of approximately 5 micro-seconds duration.

Digital input data in the form of electrical signals is supplied on line 25 by a conventional gate circuit 19 and is capacitively coupled via a coupling capacitor 26 to the cathode K of the vidicon tube 11. The gate circuit 19 is conditioned to stop the flow of input data being supplied on line 25 on alternate vertical sync pulses. The control pulses for this purpose are provided on line 27 by the divide-by-two binary divide circuit 17 previously discussed. It will be appreciated that these same control pulses may be supplied, for example, via line 28, to digital data output control circuits (not shown) to condition the output flow of data as desired.

Output information in the form of voltage pulses is developed across an output resistor $R_0$ which is connected across a transparent conducting backplate 29 of vidicon 11. The voltage pulses are capacitively coupled via a coupling capacitor 31 to an output preamplifier 21. The amplified digital output data signals may then be supplied, as desired, to the digital data output control circuits (not shown).

Power supply circuits 20 for powering all the above circuits are provided. These circuits may be of conventional design as known in the art for this purpose. The circuits supply the cathode and target bias voltages for the vidicon tube 11, operating voltages for the strobe lamp 22, and appropriate operating voltages for the remaining circuit components of the system.

In conventional operation of a vidicon, such as vidicon tube 11, the surface of photosensitive target material 14 is, because of prior electron beam scanning, initially at the potential of cathode K i.e.,–300 volts). At the same time, because of the 280-volt D.C bias on the backplate 29, a +20 volt potential difference exists between the front and back surfaces of the photosensitive target 14. When a pattern of light is focused through glass plate 30 (i.e., as by a lens system, not shown) on the target 14, the target conductivity increases at illuminated portions in proportion to the intensity of the light illumination. Elements of the target material 14 will shift their potential difference relative to the backplate 29 by varying amounts due to leakage currents to the backplate 29. When the target material 14 is scanned by an electron beam (represented by the arrows of FIG. 1) controlled by magnetic field H, variations in beam current across $R_0$ will be produced in proportion to the target 14 element location potential being scanned. A negative charge will be deposited on each target element of 14 proportional to the amount of potential shift which occureed in that element on writing, that is, when exposed to the optical pattern via glass 30. As a result, capacity current variations will flow to the backplate 29 and voltage variations corresponding to the input light signal will be produced across the output resistor $R_0$.

In the present invention, no optical input of data is contemplated, although a predetermined bias or coding pattern could be superimposed on glass plate 30 for such a purpose, if desired. Referring now to the timing diagram of FIG. 2 in conjunction with FIG. 1, the operation of this embodiment of the invention may be described as follows. An operating cycle commences when, on a vertical sync pulse the divide-by-two divider circuit 17 produces a trigger pulse to strobe control circuit 16 and strobe lamp 22 is fired to produce its short (5 microseconds) duration high intensity light pulse. This light pulse charges the entire target material 14 to the level to accept input data, thus conditioning the target. The input data then modulates the electron beam intensity from cathode K by introducing variations in the 300-volt cathode potential. As the electron beam scans the target material 14 on a first or input scan, the input data is placed onto the target material 13 elements and appear as potential variations due to the varying scan current intensity while providing an output signal current across $R_0$. At the end of the input scan (i.e., scan number 1) the target thus retains all the input data in storage.

A second or read scan of the target 14 material is then initiated by the deflection circuitry 12. As the now unmodulated electron beam scans the target, voltage variations in proportion to the stored data are produced across the output resistor $R_0$ by the same mechanism of capacitive currents described above with respect to the conventional operation of a vidicon. Actually, the readout signal on the read scan (i.e., scan number 2) is inverse to the initial input scan signal in polarity, but, when desired, this minor difference may easily be accounted for by the use of an inverter circuit (not shown) in the output. A new operating cycle is then commenced upon generation of the third vertical sync pulse after the initialization vertical sync pulse and the entire process repeated. If desired, the described system may be designed to provide two read scans for each input scan. This mode of operation is particularly suited when the encoded information is in a form which is relatively unaffected by the shading characteristics of the tube.

Figures 2, 3:
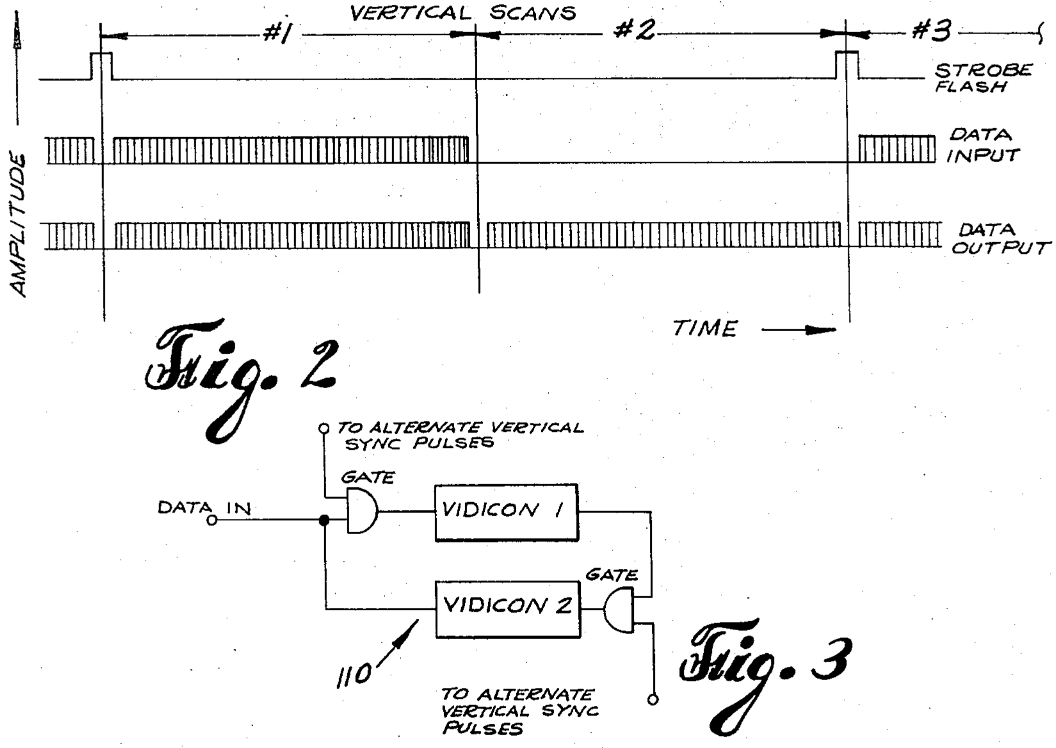
FIG. 2 is a timing diagram for the operation of the embodiment shown in FIG. 1.
FIG. 3 is a schematic circuit diagram showning a modified embodiment for use as a long term storage system.

If two such memory circuits as shown in FIG. 1 are connected as indicated in FIG. 3, so that the output signal of one is connected through gating circuitry which may be conditioned similarly to gate 18 of FIG. 1, to the input signal terminal of the other and vice versa, data may be permanently stored by the process of continually reading out of one and into the other. This is indicated schematically by the system 110 which permits updating and permanent storage of data. Also, while the circuit 10 provides a serial readout data storage system, it will be appreciated by those skilled in the art that random access to a particular portion of the data may be provided by logic circuitry capable of positioning the electron scan beam on selected areas of the target material 14 as desired.

While the embodiment of the invention shown in FIG. 1 shows the data input connected to the cathode K, it will be appreciated by those skilled in the art that input and output signals may be provided from other tube elements of the vidicon tube 11. For example, the output or input signals could be derived from current variations at collector mesh M and applied to grid G, respectively, if desired.

The above described memory storage circuits are applicable to the storage of either digital or analog data or even a mixture of each, since the modulation of the input data waveform does not materially affect the functioning of the circuit to a reasonable degree. Thus, the above description is intended as illustative only and not as a limitative boundary on the concepts of the invention. Memory storage circuitry according to the invention may be utilized for television scan conversion, data time-base converstion, serial to parallel color television conversion and to various types of digital memories. The stored data may include analog video, FM carrier, AM carrier and other forms. The invention may also be employed in stop motion television by utilizing FM modulation and continuous data transfer between two tubes.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A method for storing and reading out electrical information signals comprising the steps of:

*a.* conditioning a first photosensitive target by exposing it to light to provide a first uniformly charged target area;
*b.* scanning said first area with a first electron beam which is modulated as a function of the data to be stored to thereby alter the charge distribution pattern on said first area;
*c.* retrieving data stored on said first area by scanning said first area with a second electron beam to produce a first electrical output signal which varies as a function of the charge distribution pattern on said first area;
*d.* conditioning a second photosensitive target by exposing it to light to provide a second uniformly charged target area;
*e.* scanning said second area with a third electron beam which is modulated as a function of said first output signal to thereby alter the charge distribution pattern on said second area;
*f.* conditioning said first target by exposing it to said light;
*g.* retrieving data stored on said second area by scanning said second area with a fourth electron beam to produce a second electrical output signal which varies as a function of the charge distribution pattern on said second area;
*h.* scanning said first area with said first beam while modulating said first beam as a function of said second output signal; and
*i.* sequentially repeating steps *d–h* hereof to form a long term data storage system.

2. A method for storing and reading out electrical information signals comprising the steps of:

*a.* conditioning a first photosensitive target by exposing it to light to provide a first uniformly charged target area;
*b.* scanning said first area with a first electron beam which is molulated as a function of the data to be stored to thereby alter the charge distribution pattern on said first area;
*c.* retrieving data stored on said first area by scanning said first area with a second electron beam to produce a first electrical output signal which varies as a function of the charge distribution pattern on said first area;
*d.* said first photosensitive target is provided by a vidicon tube;
*e.* said light is produced as a high intensity, short duration pulse from a strobe light;
*f.* conditioning a second photosensitive target by exposing it to light to provide a second uniformly charged target area;
*g.* scanning said second area with a third electron beam which is modulated as a function of said first output signal to thereby alter the charge distribution pattern on said second area;
*h.* conditioning said first target by exposing it to said light;
*i.* retrieving data stored on said second area by scanning said second area with a fourth electron beam to produce a second electrical output signal which varies as a function of the charge distribution pattern on said second area;
*j.* scanning said first area with said first beam while modulating said first beam as a function of said second output signal; and
*k.* sequentially repeating steps *f–j* hereof to form a long term data storage system.

3. Apparatus for storing and reading out electrical information signals comprising:

*a.* photosensitive target means including a vidicon tube;
*b.* conditioning means including strobe lamp means for conditioning said target means to produce a first uniformly charged target area;
*c.* input scan means for input scanning a first electron beam across said first area;
*d.* modulating means for modulating said first beam by an input data signal to produce a charge distribution pattern on said first area which varies as a function of said input data signal;
*e.* output scan means for output scanning an unmodulated electron beam across said first area following production of said charge distribution pattern to form a first electrical output signal which varies as a function of said pattern;
*f.* second photosensitive target means, conditioning means, input scan means, modulating means and output scan means having an input supplied by said first output signal to form a second output signal which varies as a function of the input data signal; and
*g.* connecting means supplying said second output signal as said input data signal to form a long term storage system.

4. Apparatus as defined in claim 3 further including means for forming two output scans for each input scan.

5. An electronic apparatus for storing and reading out electrical information comprising:

*a.* vidicon tube means having a photosensitive target and a cathode means for emitting a beam of electrons;
*b.* means for focusing deflecting, and aligning the electron beam emitted by said cathode;
*c.* scanning means for sequentially scanning across the photosensitive target by an eletron beam from said cathode, said scanning means including;
*d.* sync pulse generating means for generating horizontal sync voltage pulses for controlling horizontal deflection of the electron beam in horizontal scan across said target and for generating vertical sync voltage pulses for controlling the vertical sweep of said electron beam scross said target;

*e*. blanking amplifier means responsive to vertical sync voltage pulses from said sync pulse generating means for shutting off the electron scan beam during the retrace interval of said beam scan;

*f*. strobe lamp means responsive to said vertical sync voltage pulses for delivering a high intensity light pulse to said photosensitive target upon occurrence of alternate vertical sync voltage pulses for conditioning said target to produce a uniformly charged target area;

*g*. input scan means for input scanning said electron beam across said conditioned target area, said input scan means including;

*h*. modulating means for modulating said beam by an input data signal to produce a charge distribution pattern on the target area which varies as a function of said input data signal; and

*i*. output scan means for output scanning a second electron beam across said target area following production of the charge distribution pattern to form a first electrical output signal which varies as a function of said charge distribution pattern.

* * * * *